US006628447B1

(12) United States Patent
Want et al.

(10) Patent No.: US 6,628,447 B1
(45) **Date of Patent: *Sep. 30, 2003**

(54) ARRAY OF ROTATABLE SOLID ELEMENTS FOR COLOR DISPLAY

(75) Inventors: Roy Want, Los Altos, CA (US); David Goldberg, Palo Alto, CA (US); Anthony G. LaMarca, Redwood City, CA (US); Todd A. Cass, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,208

(22) Filed: Dec. 6, 1999

(51) Int. Cl.[7] .......................... G02B 26/08; G09G 3/34

(52) U.S. Cl. ....................................... 359/211; 345/108

(58) Field of Search .............................. 349/1; 359/226, 359/227, 228, 837, 832, 230, 234, 211; 345/85, 108, 84; 40/439, 440, 477, 479, 480, 503, 33, 406

(56) References Cited

U.S. PATENT DOCUMENTS

| | | | | |
|---|---|---|---|---|
| 3,664,047 A | * | 5/1972 | Ruppert | 40/33 |
| 4,295,127 A | * | 10/1981 | Sautter et al. | 340/764 |

OTHER PUBLICATIONS

Micromachines on the March, Janusz Bryzek, Kurt Petersen and Wendell McCulley, IEEE Spectrum, May 1994, pp. 20–31.

* cited by examiner

*Primary Examiner*—Robert H. Kim
*Assistant Examiner*—Tai Duong
(74) *Attorney, Agent, or Firm*—Joseph M. Young

(57) ABSTRACT

A display array element including a substrate, a prism rotatable relative to the substrate, and a fluid conduit defined in part by the substrate. The prism has a first viewable surface having fist reflectance characteristics and a second viewable surface having second reflectance characteristics. The fluid conduit permits direction of fluid against the prism to rotate the prism to selectively allow viewing of one of the first and second viewable surfaces.

11 Claims, 9 Drawing Sheets

FIG. 1A
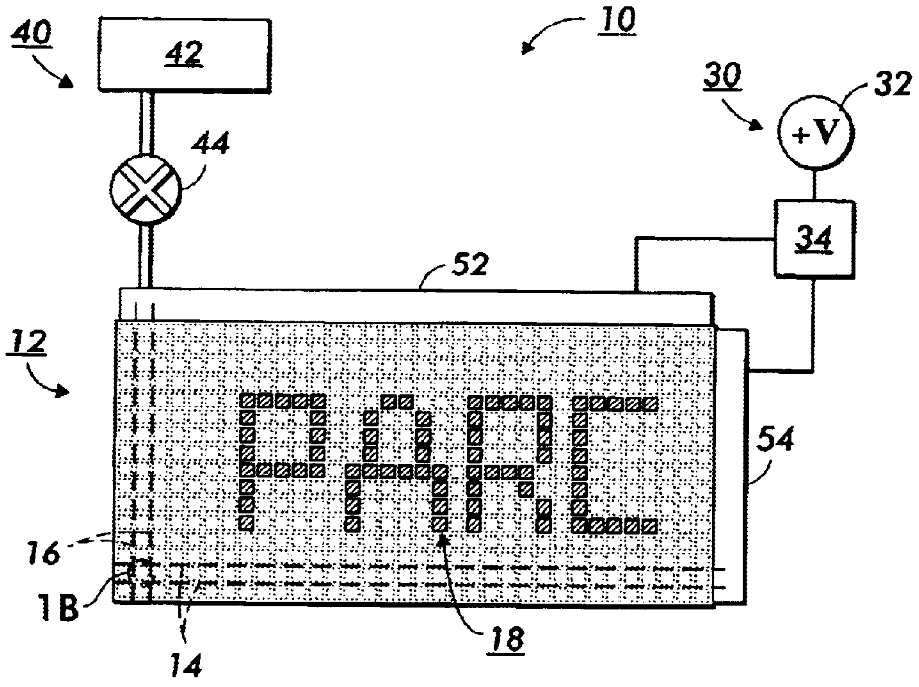
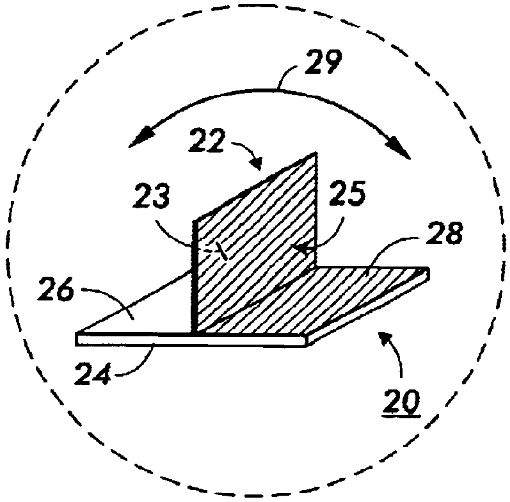
FIG. 1B

FIG. 2
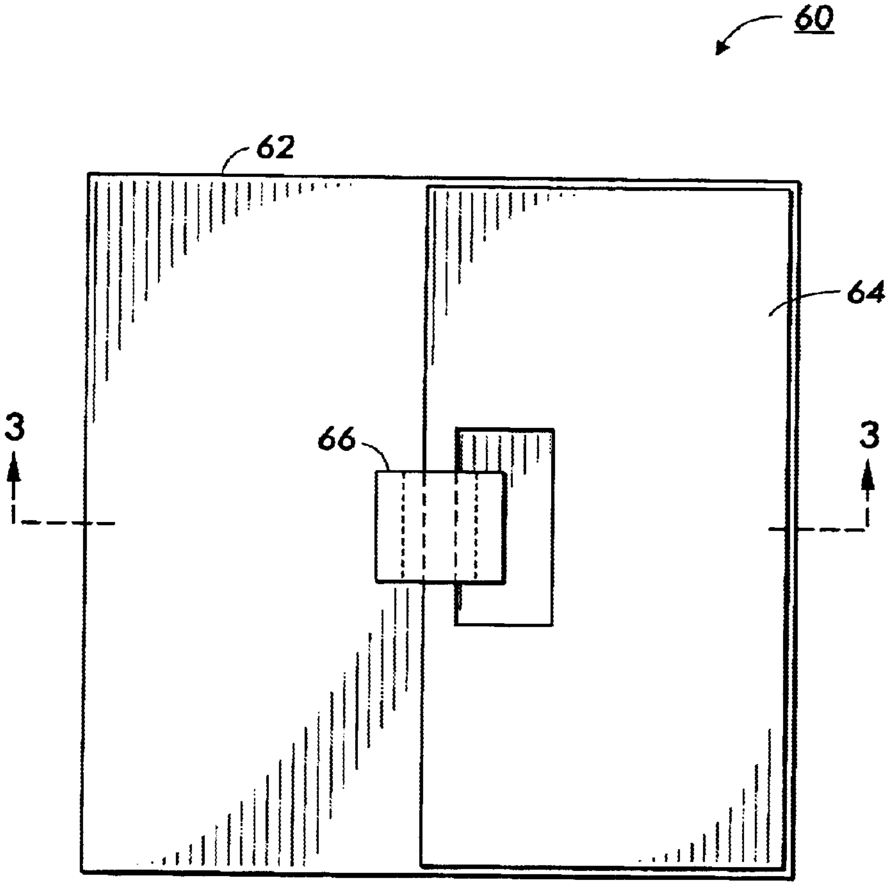
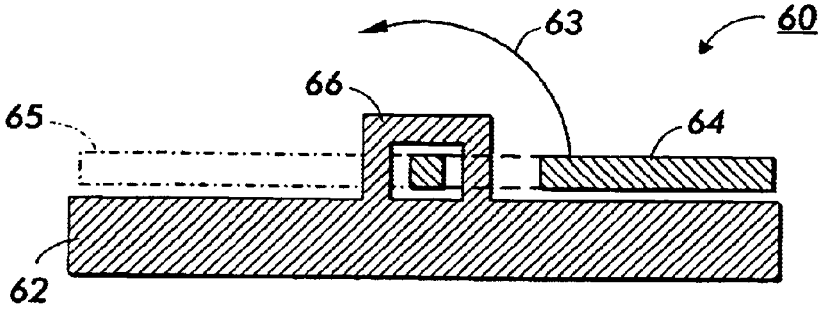
FIG. 3

FIG. 4
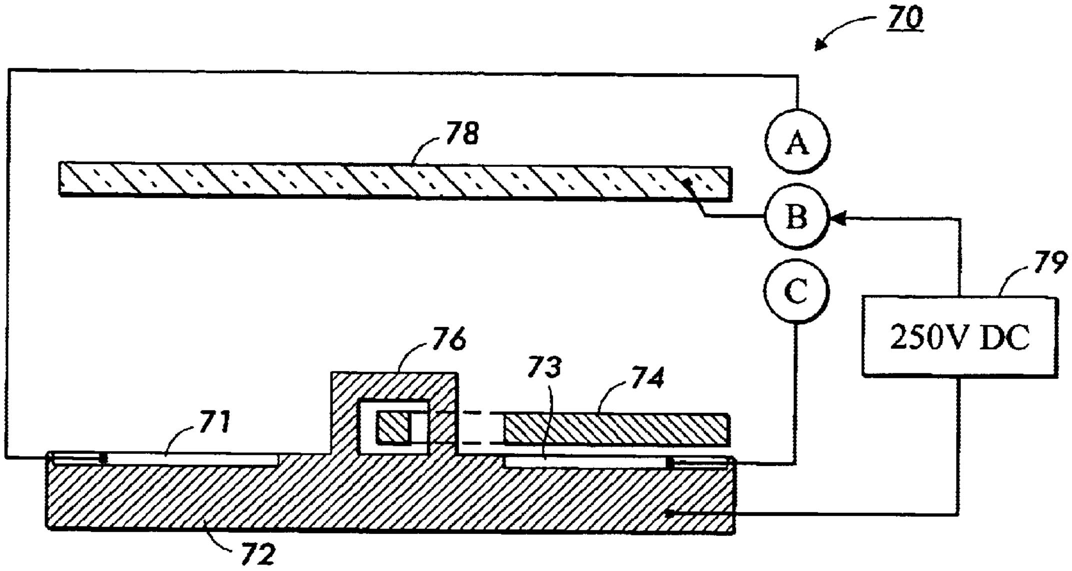
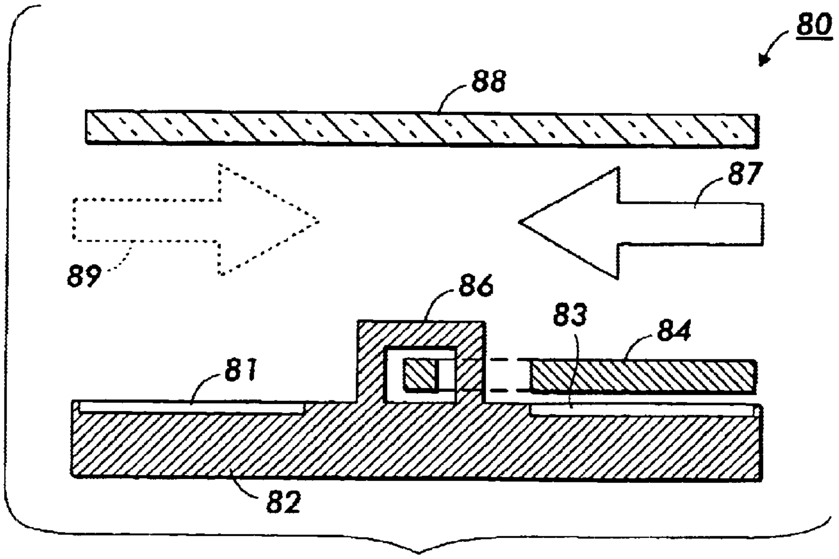
FIG. 5

FIG. 6
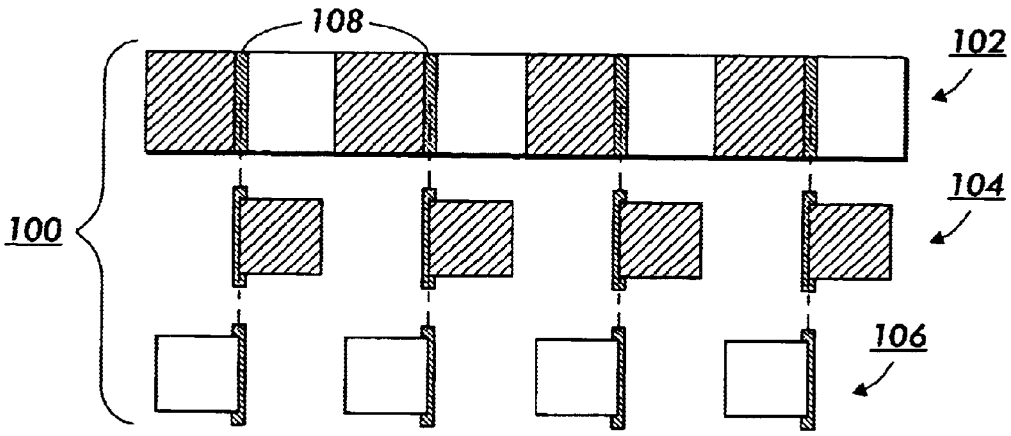
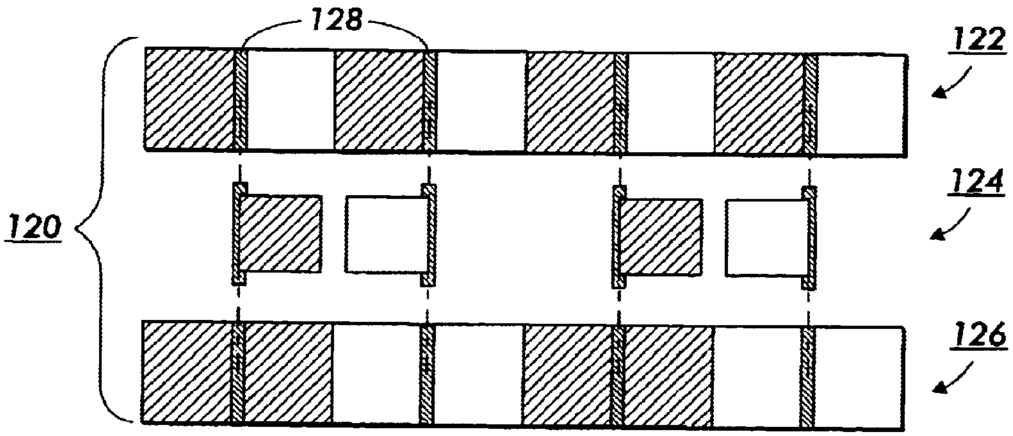
FIG. 7

FIG. 8
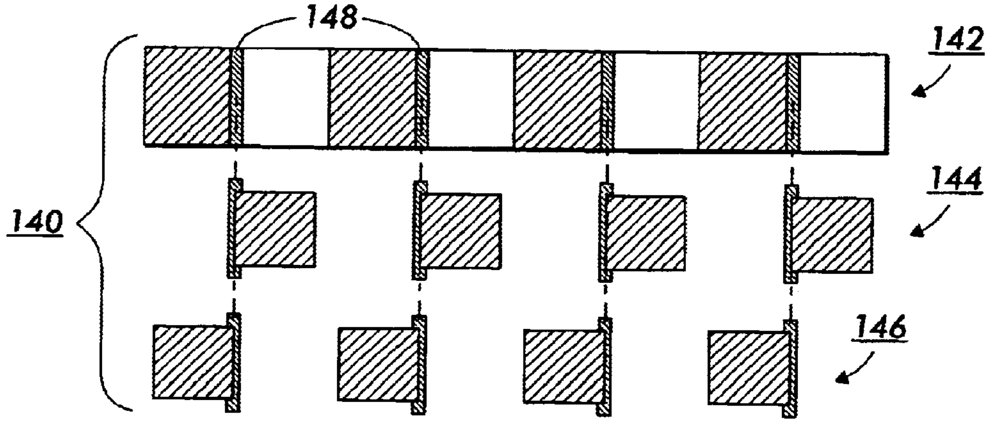
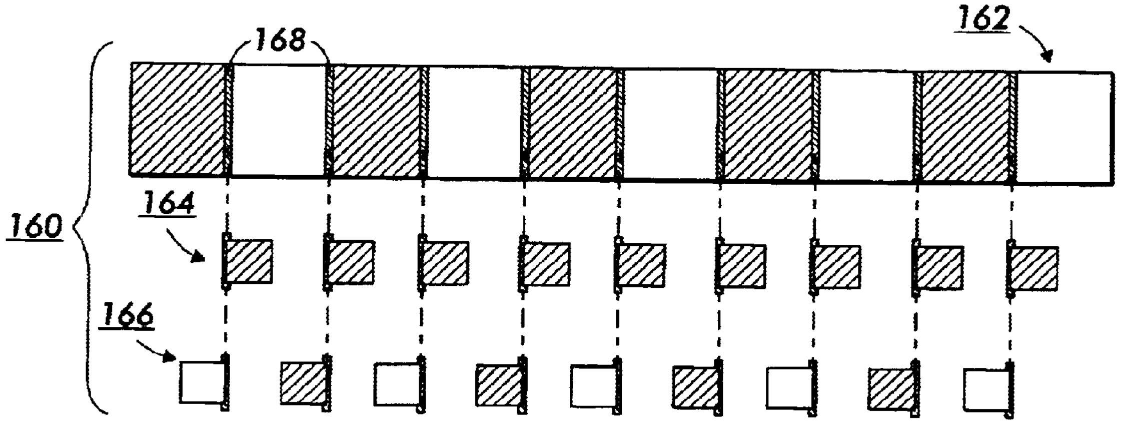
FIG. 9

ARRAY OF ROTATABLE SOLID ELEMENTS FOR COLOR DISPLAY

CROSS REFERENCE

Cross-reference is made to concurrently filed patent application, Ser. No. 09/455,210, filed Dec. 6, 1999, entitled, now abandoned; MICROELECTROMECHANICAL FLAP ARRAY FOR LOW POWER DISPLAYS, by Roy Want et al, Ser. No. 09/455,307, filed Dec. 6, 1999, entitled, now U.S. Pat. No. 6,456,273; FLAP ARRAY UNDER FLUIDIC AND ELECTRICAL CONTROL, by Roy Want et al, Ser. No. 09/454,512, filed Dec. 6, 1999, entitled, now abandoned; FLAP ARRANGEMENT FOR MICROELECTROMECHANICAL DISPLAYS, by Roy Want et al, Ser. No. 09/455,555, filed Dec. 6, 1999, entitled, now abandoned; TILED FLAP ARRAY FOR MICROELECTROMECHANICAL DISPLAYS, by Roy Want et al.

FIELD OF THE INVENTION

The present invention relates to mechanically actuated color displays. More particularly, the present invention relates to microelectromechanical displays using rotating colored prisms as display elements.

BACKGROUND AND SUMMARY OF THE INVENTION

Passive displays based on backlit liquid crystals, or active displays based on light generative light emitting diodes or thin film transistors, are widely used in conjunction with electrical devices or computing technologies requiring status displays or user monitoring capability. Such displays are inexpensive, and manufacturable in sizes generally ranging from less than 1 square centimeter to several thousand square centimeters (with hundreds to millions of pixels). Unfortunately, both active and passive displays require a continuous source of power to maintain a display image, making them unsuitable for many low power applications where only battery power (or other low power voltage source, e.g. photovoltaic) is available. Further, in many high ambient light environments, both active and passive displays can be difficult to view, since they are generally low contrast and have a limited preferred viewing angle.

Accordingly, the present invention provides a high contrast display technology that does not require power to maintain a particular image, making it particularly suitable for use in conjunction with low power electronic or computational devices. The present invention is manufacturable using conventional microelectromechanical techniques, and pixel switching is fast enough to replace conventional active or passive displays. Further, in certain embodiments, displays in accordance with the present invention can support one bit displays (black or white), gray scales, or even colored displays. In other embodiments, non-electrical power sources can even be used to enable pixel switching, further reducing reliance on batteries.

One embodiment of the present invention provides an electrostatically controlled mechanical pixel useful for visual displays. The display array is constructed so each element of the array includes a background substrate divided into a first region and a second region, with each region having distinct light reflectance characteristics. A flap is movable between a first position blocking at least a portion of the first region of the background substrate and a second position blocking at least a portion of the second region of the background substrate. The flap can be constructed of polysilicon rotatably attached with hinges to the background substrate, and manufactured using conventional semiconductor etching techniques. A flap catchment mechanism, typically electrostatic, is used for alternatively facilitating movement of the flap between the first and second position. To actually move the flap into a position allowing flap catchment, an impulse mechanism is employed to move the flap away from one of the first or second positions. The impulse mechanism can be electrostatic based, and can be separate or combined with the flap catchment mechanism.

In certain preferred embodiments, each mechanical pixel of the display array is bistable and electrostatically controlled, with the flap catchment mechanism including a first conductive plate positioned in the first region of the background substrate and a second conductive plate positioned in the second region of the background substrate. The impulse mechanism includes a transparent sheet electrostatically chargeable to attract the flap, with the transparent sheet positioned in parallel spaced apart relationship to the background substrate to define a cavity, and with the flap attached to the background substrate to movably extend into the cavity in response to electrostatic attraction by the transparent sheet.

In operation, a user perceptible display requiring little or no power for display maintenance is available since the background substrate has a first defined light reflection characteristic, while the flap has a second defined light reflection characteristic differing from the first defined light reflection characteristic. Because the flap is positioned adjacent to the background substrate and movable to a first position covering at least a portion of the background substrate, various patterns, including text, symbols, digital images can be displayed. Depending on ambient lighting, available power, size of flaps, flap reflection characteristics, flap switching speeds, display arrays rivaling conventional LCD display arrays but requiring substantially less electrical power for operation can be created in accordance with the present invention.

To even further minimize requirements for continuous electrical power, one embodiment of the present invention provides a display array based on bistable pixels with flap switching controlled at least in part by air flow provided by pressurized cylinders or other suitable pressure sources. Such a low electrical power display array element includes a background substrate, a flap attached for movement with respect to the background substrate, and a flap catchment mechanism for alternatively facilitating movement of the flap between the first and second position. A fluid conduit is defined in part by the background substrate, with the fluid conduit permitting direction of fluid against the flap to move the flap away from one of the first and second positions. The fluid conduit is connectable to a pneumatic pressure source for directing air against the flap when the flap is in one of its first and second positions.

In one embodiment, the fluid conduit is attached to a pneumatic pressure source for directing air substantially parallel to the flap when it is in one of its first and second positions. This creates low pressure conditions that lift the flap away from the background substrate, allowing air flow between the flap and the background substrate to flip the flap between positions. The flap catchment mechanism is a mechanical, electromagnetic, electrostatic, pneumatic, or other suitable mechanism that transiently holds the flap in a desired position during air flow. For example, an electrostatic catchment can include a first conductive plate positioned in a first region of the background substrate and a second conductive plate positioned in a second region of the background substrate, with either plate electrostatically attracting and holding the flap. This combination of low-power flap-catchment mechanism and non-electrical flap impulse mechanism reduces total electrical switching costs, and is especially useful for portable or battery powered displays.

Using the foregoing described bistable display elements, various combinations of background substrate/flap colors can be used to create gray scale or colored displays with desired brightness/resolution. For example, a display array can be constructed to have a background substrate divided into an array of alternating first region and second regions, each region having differing light reflectance characteristics. A plurality of flaps is attached to the background substrate, with each flap attached at a hinge positioned at a boundary between alternating first and second regions, and with each flap movable between a first position blocking at least a portion of the first region of the background substrate and a second position blocking at least a portion of the second region of the background substrate. Each flap is constructed to have a first and a second side with differing light reflectance characteristics (e.g. white/black, white/gray, gray/black).

In certain embodiments, each flap is attached to the background is substrate by a hinge positioned at a boundary between every other alternating first and second regions, while in other embodiments each flap is attached to the background substrate by a hinge positioned at a boundary between every alternating first and second regions, allowing overlap of adjacent flaps. For example, a display array can be constructed by dividing a background substrate into an array of alternating black (B) and white (W) regions. Hinges (H) are then attached to the background substrate to form a repeating pattern BHWBHW, while each hinge attached flap is movable between a first position blocking one black (B) region and a second position blocking one white (W) region. Alternatively, the hinges (H) can be attached to the background substrate to form a repeating pattern BHWHBHWH, with the flaps movable between a first position blocking one black (B) region and a second position blocking one white (W) region. In both alternatives, each flap has a first and a second sides, the respective side of each flap having differing light reflectance characteristics, ranging from an extreme of black/white, to various grayscale or color combinations.

Adjustments to resolution, gray scale range, or switching efficiency in bistable flap elements according to the present invention are possible with careful selection of flap shape geometry. For example, a suitable display array can include a background substrate divided into multiple regular tiles. The multiple regular tiles can be covered with flaps shaped and sized to match one corresponding regular tile, with each flap positionable with respect to the background substrate to be movable between a first position completely blocking viewing of one corresponding regular tile and a second position completely blocking viewing of an adjacent corresponding regular tile. The flaps are normally constructed to have first and a second sides, with the respective side of each flap having differing light reflectance characteristics.

Various patterns or layouts of multiple regular tiles can be used. In preferred embodiments, each multiple regular tile has identical shape and size. Suitable tiling patterns include square, triangular, or hexagonal tilings (or subdivisions thereof, e.g. half a hexagon, rectangular or triangular divisions of a square, or triangular divisions of a hexagon) that completely cover a plane surface. For certain embodiments, two or more distinct regular tiles having differing sizes and shapes can be used for flap patterns. Also within the scope of the present invention are non-plane covering patterns, including disjoint tilings with gaps to allow for layout of electrical contacts or fluid conduits.

In still another embodiment of the invention particularly suitable for color displays, a non-flap variant of a mechanical pixel that provides tri-color switching using rotating solid. A display array element includes a substrate and a prism rotatably attached to the substrate. The prism has at least a first viewable surface having first reflectance characteristics and a second viewable surface having second reflectance characteristics, and in a most preferred embodiment has a third viewable surface having third reflectance characteristics. A fluid conduit is defined in part by the substrate, with the fluid conduit permitting direction of fluid against the prism to rotate the prism to selectively allow viewing of one of the first and second viewable surfaces.

Typically, the fluid conduit is attached to a pneumatic pressure source for directing air substantially parallel to one of the first, second or third viewable surfaces of the prism. A rotation catchment mechanism can be attached to limit rotation of the prism. Typically each viewable surface provides a distinct gray level, which can range from white to black. Alternatively, multiple primary or secondary additive colors can be used to respectively color each viewable surface.

Additional functions, objects, advantages, and features of the present invention will become apparent from consideration of the following description and drawings of preferred embodiments.

BRIEF DESCRIPTION OF THE DRAWINGS

FIG. 1 schematically illustrates a microelectromechanical flap array used as a visual display;

FIG. 2 illustrates a top-down plan view of a bistable flap suitable for use in a display array;

FIG. 3 is a side cross-sectional view of the flap of FIG. 2;

FIG. 4 is one embodiment of a bistable flap architecture that uses electrostatic forces to move and latch a flap in one of two positions;

FIG. 5 is one embodiment of a bistable flap architecture that uses fluid forces to move and electrostatic forces to latch a flap in one of two positions;

FIG. 6 schematically illustrates layout of single row of a flap array used as a visual display;

FIG. 7 schematically illustrates layout of single row of a flap array bistable between black and white, with flaps positionable to show an overall gray;

FIG. 8 schematically illustrates layout of single row of a flap array bistable between black and white, with flaps positionable to show an overall gray having a finer resolution than that illustrated by FIG. 7;

FIG. 9 schematically illustrates layout of single row of a flap array, with flaps positionable to overlap;

DETAILED DESCRIPTION OF THE INVENTION

Figure 10:
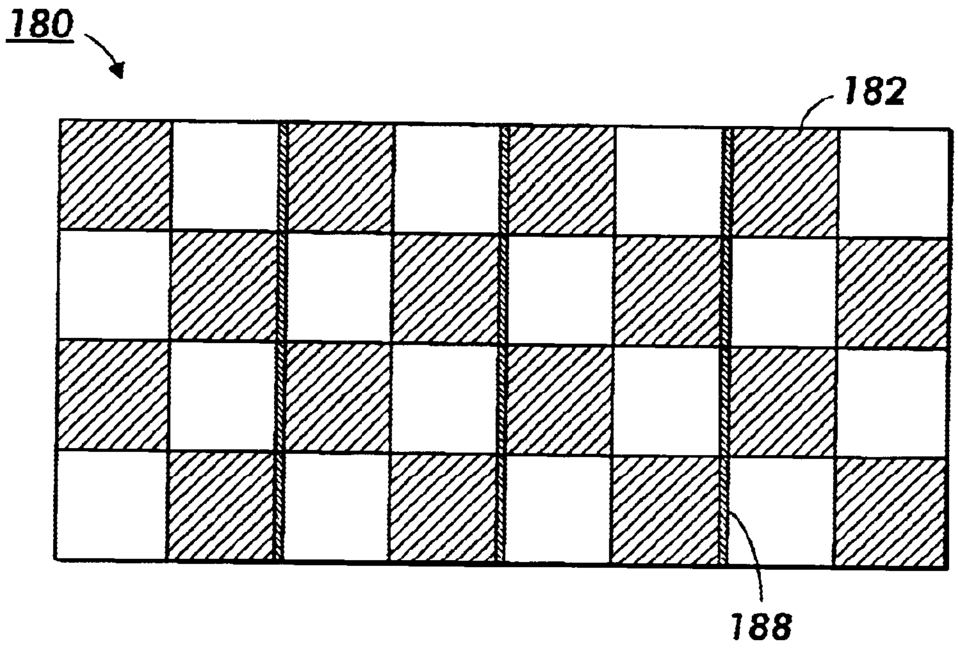
FIG. 10 illustrates an embodiment of an visual display with square flaps arranged in a plane covering tiling pattern.

As seen in FIG. 1, a visual display system 10 is constructed from a microelectromechanical, flap-based display array 12. The display array 12 includes horizontal rows 14 and vertical rows 16 of light reflective pixels that are individually addressable to create textual displays 18, or various other patterns, symbols, images or visual backgrounds. As seen blown-up view inset in FIG. 1, a pixel 20 includes a background substrate 24 divided into a first region 26 having a high optical reflectivity (e.g. white) and a second region 28 having a low optical reflectivity (e.g. black). A flap 22 is attached to the background substrate 24 at the juncture between regions 26 and 28. The flap 22 is constructed with one side 23 to have a high optical reflectivity (e.g. white, using reflective metals such as aluminum, or MgO) selected to match first region 26 of background substrate 24, and the opposing second side 25 to have a low optical reflectivity (e.g. black, using light absorbing coatings, or alternatively, roughening and etching to reduce backscattered light, with the latter method allowing precisely defined gray shadings as well) selected to match second region 28 of background substrate 24. The flap 22 is movable (as indicated by arrow 29) between a position covering region 26 and a position covering region 28. In operation, for example, a white and black colored flap can be rotated to lie flat against the region 26, presenting a visual appearance of an entirely black pixel composed of the black side of flap 22 and the black region 28 of the background substrate 24. Conversely, the flap can be rotated to lie flat against the region 28, presenting a visual appearance of an entirely white pixel composed of the white side of flap 22 and the white region 26 of the background substrate 24. Advantageously, this arrangement provides a large aperture ratio of pixel color to pixel control elements. Through selective adjustment of flaps in the display array 12 (which may involve various conventional halftoning techniques) images that do not require continuous electrical power for maintenance can be composed.

Flap position can be controlled by application of various electrostatic, electromagnetic, or fluidic based mechanisms. For example, an electrical control system 30 can include an electrical power supply 32 and control logic 34. Individual flaps are addressed by simultaneous activation of specified row controllers 54 and column controllers 52 during a pixel scanning sequence, or alternatively, by active address lines to each pixel (for smaller displays). The electric control system 30 can operate alone, or in conjunction with a fluidic control system 40. The fluidic control system can use, for example, a pressurized pneumatic source 42 (which may be compressed air, nitrogen, carbon dioxide, or other suitable pressurized gas) and valve control system 44. The row controllers 54 and column controllers 52 can include a suitable fluid manifold for directing fluid along a row or column, inducing switching all the flaps to a predefined state.

To better appreciate a particular embodiment of a flap mechanism, FIG. 2 illustrates a top-down plan view of a bistable flap 60 suitable for use in a display array such as discussed in FIG. 1; while FIG. 3 is a side cross-sectional view of the bistable flap 60. The flap can be constructed using conventional micromachining techniques, including use of sacrificial layers, chemical etching, and patterned resists. A hinge 66 integrally attached to substrate 62 retains flap 64, while still allowing rotational movement (in a direction indicated by arrow 63) from a first position (as seen in FIG. 3) to second position 65. As will be appreciated, various modifications to this basic flap are contemplated, including use of multiple hinges, use of flexible hinges, and use of more complex layering or patterning to enhance electrostatic, electromagnetic, or fluid effects on the flap 64.

On particular embodiment illustrated in FIG. 4 shows a bistable flap system 70 suitable for use as a component in display arrays that use electrostatic forces to move and latch a flap in one of two positions. The system 70 includes a polysilicon flap 74 mounted by hinge 76 to a substrate 72. A transparent sheet 78 of indium tin oxide (ITO) coated glass is placed above the flap 74, defining a cavity between the sheet 78 and substrate 72 sufficient distance for the flap to move freely without touching the glass in its vertical position. The gap between the substrate and the glass should be minimized to reduce the actuation potential. In operation, a 250 Volt DC potential from electric power supply 79 is applied between the ITO glass and hinge 76 (position B). This potential causes an electric field to be set up between the flap, and when fully charged, an attractive force is developed that is sufficient to overcome both gravity and frictional forces in the hinge. As a result the flap 74 is raised to the vertical position pointing toward sheet 78. If the potential is removed, the flap will usually remain in this position absent any further applied force. An additional applied force capable of catching the flap 74 can be created by moving the DC potential to either position A or C in FIG. 4, developing an electrostatic force between the flap and one of the two electrically conductive plates 71 and 73 attached to the substrate. If the flap is colored black on one side and white on the other, it is now possible to chose the final appearance of the pixel.

As will be appreciated, some care needs to be taken when applying a potential in case A and C because a charged flap that contacts the plate on the substrate will result in charge flowing between it and the base-plate. In this situation, the small amount of heat that is generated can weld the two components together. To prevent such welding contacts, the applied potential can be in the form of a short pulse to minimize the amount of charge available when the flap contacts the plate. Alternatively, the plates 71 and 73 can be insulated in the fabrication process to avoid charge flowing between the components when the flap 74 is in the horizontal position. Since the plates 71 and 73 must be coated black or white, the deposition of the coating material could also be part of an insulating process.

To reduce the total required electrostatic forces for pixel switching, as seen in FIG. 5 another embodiment of a bistable flap system 80 can use fluid forces 87 and 89 to move a flap 84 attached by hinge 86 to a substrate, and electrostatic forces to latch the flap 84 in one of two positions. For example, airflow is an alternative approach to electrostatics in order to move the flap 84 as seen in FIG. 5. A flow 87 of compressed air over the flap 84, when oriented horizontal with respect to the flow, will cause the flap 84 to lift-up due to the low pressure region generated above it by the fast moving air. As soon as it begins to lift, the air flow now catches under the flap forcing it into the down flow position. If the display were not controlled, all flaps would end up in the down flow position. The display would therefore show all black or all white pixels. By reversing the direction of the flow the opposite pixel-state can be generated at all of the pixels. In order to build a pixel addressable display using this technique, which flaps move and which flaps must remain in the same position is determined by applying a potential between the flap and one of two electrostatically or electromagnetically chargeable plates 81 and 83. The attractive electrical force ensures that the pressure change as a result of the airflow is not sufficient to turn the flap 84 over. In operation, after applying the appropriate pattern of charges to the plates within a pixel array, the air flow is then turned on and only the flaps move that are necessary to create the required image.

Various embodiments of background substrates and flap layout are contemplated. For example, FIG. 6 schematically illustrates an exploded view of a portion of layout of single row 100 of a flap array used as a visual display. As will be understood, this arrangement allows a flap arrangement capable of achieving pure black or pure white. The top row 102 shows the colors of the background with the positions of hinges 108 marked. The second row 104 shows what the flaps look like when they are flipped to the right of the hinge—each flap is colored black on this side. Of course the flaps lie on top of the background, but are drawn in a separate row underneath the background to make it clear how their sides are colored. The third row 106 shows the flaps when flipped left: this side is white for each flap. So it is clear that when all the flaps are flipped right the display will be totally black, and when all are flipped left it will be totally white. To achieve gray with this design, the flaps would be flipped alternately left and right. This is illustrated in FIG. 7, which schematically illustrates layout of single row 210 having alternating black and white colored substrate 122. Flaps are positionable as seen in row 124 to show an overall gray as seen in row 126. To increase gray level resolution, FIG. 8 schematically illustrates layout of single row 140 of a flap array bistable between black and white, with flaps positionable as indicated by rows 144 and 146 to display a complete black (row 144 position) and a gray (row 146 position). To even further increase resolution, FIG. 9 schematically illustrates layout of single row 160 of a flap array, with gray, white, and black flaps (as seen schematically in rows 164 and 166) positionable to overlap. Hinges are provided at each transition between black and white in substrate 162 (as compared to hinges at every other transition as seen in FIGS. 6, 7, and 8).

As will be appreciated, various flap layouts schemes can increase grayscale resolution of a display composed of an array of flaps. For example, consider any of the foregoing configurations where flaps essentially abut one another. Each flap in an array then represents an element that can produce two different grayscales, one for each of the two flap positions. As previously noted, in the fabrication process each side of a flap, as well as the background on either side of the hinge, can be fabricated with one of a discrete set of gray reflectance values. So the display elements can each assume one of two reflective states, say $\rho^0$ and $\rho^1$ where $\rho^0,\rho^1\epsilon\{\rho_i\}_{i=0}^{2K-1}$ can assume one of 2K particular discrete reflectance values $0.0\leqq\rho i\leqq 1.0$. These display elements (flaps) are grouped into element groups of size K display elements, forming display pixels. For example pixels might be 2×2, 2×3, or 3×3 display elements. There are $2^K$ different flap configurations that the K flaps forming a display pixel can assume. The element group then forms a gray-level pixel capable of a large number ($<2^K$) different gray levels. The size, K, of the element group, and the specific set of 2K reflectance values can be chosen to optimize the dynamic range and gray-level resolution of a display formed by a large array of such element groups.

The brightness of the light reflected from an element group is simply the sum of the brightness of the light reflected from each of the flaps in the group. Let ρi represent the reflectance of the $i^{th}$ flap in an element group of size K. The reflectance $\rho_i$ of this flap can assume one of two values, $\rho_i^0$ and $\rho_i^1$, depending on the state of the flap. The total light reflected by the an element group is $$B=\sum_{i=0}^{K-1}\rho_i.$$

To illustrate the approach consider small element groups of say, 2×2 pixels. Assume a set of gray levels $\rho_i^1=(1/2)^i$ and $\rho_i^0=0.0$. This allows 16 distinct brightness values from B=0.0 to B=1.875, in increments of ⅛, although dynamic range is sacrificed, however, because the maximum brightness possible is B=4 in the case of a 4 member element group.

If both sides of the flaps reflect some light we can increase our maximum possible pixel brightness at a cost of also increasing our minimum possible pixel brightness. For example if $\rho_0^1=1\rho_0^0=0\rho_1^1=3/4\rho_1^0=1/4\rho 1/2=5/8\rho_2^0=3/8\rho_3^1=9/16\rho/_3^0=7/16$. This result in a brightness range from B=17/16 to B=47/16 in steps of ⅛. As another example, the reflectance's $\rho_0^1=1/4\rho_1^1=1,\rho_2^1=1,\rho_3^1=1$ and $\rho_0^0=0,\rho_1^0=1/2,\rho_2^0=0,\rho_3^0=0$ allow a range from B=0.5 to B=3.25 in steps of 0.25. These examples illustrates the tradeoff achievable between minimum pixel brightness, maximum achievable pixel brightness, and the size of the brightness increments.

More generally, the set of brightness values an element group of size K can be expressed with a simple matrix equation. Let $\underline{B}$ be a vector representing the $2^K$ achievable brightness values, F be a matrix representing all possible configurations of the flaps, and p be a vector representing the 2K different reflectance values assigned to the flaps, leading to $\underline{B}=F\underline{\rho}$, or more concretely:

$$\begin{bmatrix} B_0 \\ B_1 \\ B_2 \\ B_3 \\ B_4 \\ B_5 \\ B_6 \\ B_7 \\ B_8 \\ B_9 \\ B_{10} \\ B_{11} \\ B_{12} \\ B_{13} \\ B_{14} \\ B_{15} \end{bmatrix} = \begin{bmatrix} 0&1&0&1&0&1&0&1 \\ 0&1&0&1&0&1&1&0 \\ 0&1&0&1&1&0&0&1 \\ 0&1&0&1&1&0&1&0 \\ 0&1&1&0&0&1&0&1 \\ 0&1&1&0&0&1&1&0 \\ 0&1&1&0&1&0&0&1 \\ 0&1&1&0&1&0&1&0 \\ 1&0&0&1&0&1&0&1 \\ 1&0&0&1&0&1&1&0 \\ 1&0&0&1&1&0&0&1 \\ 1&0&0&1&1&0&1&0 \\ 1&0&1&0&0&1&0&1 \\ 1&0&1&0&0&1&1&0 \\ 1&0&1&0&1&0&0&1 \\ 1&0&1&0&1&0&1&0 \end{bmatrix} \begin{bmatrix} \rho_0^0 \\ \rho_0^1 \\ \rho_1^0 \\ \rho_1^1 \\ \rho_2^0 \\ \rho_2^1 \\ \rho_3^0 \\ \rho_3^1 \end{bmatrix}$$

Given a set of target brightness values say $\{B_i\}_{i=0}^{s^{K-1}}$ and a flap configuration matrix F one can determine an ordering of the $B_i$ forming $\underline{B}$ and the reflectance values $\underline{\rho}$ which most closely realizes the desired brightness values. First consider optimality in a least square sense, minimizing the error $|\underline{B}-F\underline{\rho}|$.

In principle, we must consider all possible permutations of $\underline{B}$. In practice, one make a simplifying assumption that the rows F can be thought of as increasing binary numbers where the two element pairs (0,1) and (1,0) are considered binary digits. These rows are aligned with increasing values of brightness in the elements of $\underline{B}$., allowing determination of the optimal reflectance values assuming this configurations of F and $\underline{B}$. Given $\underline{B}$ we might compute the set of brightness values with the least squared error by applying the pseudo inverse, $F^+$, of the flap matrix:

$$\underline{\rho}=F^+\underline{B}.$$

Each variable $\rho_i$ either floats $0.0\leqq\rho_i\leqq1.0$, is fixed at $\rho_i=1.0$ or is fixed at $\rho_i=0.0$. The combinatorial possibilities of these three states for the set of 2K variables $\rho_i$ is investigated. For each combination the pseudo inverse is taken of the submatrix consisting of rows of F where the corresponding variable $\rho_i$ is allowed to float. If for any resulting optimal values of the subset of variables allowed to float do not all satisfy $0.0\leqq\rho_i\leqq1.0$ the solution is rejected, and the optimum value is picked from among the remaining combinations.

As will be understood, the human eye's logarithmic sensitivity to brightness can be accounted for by setting the target brightness $B_i$ forming $\underline{B}$ such that the steps are exponential corresponding to equal increments of perceptual difference. Each row of F by the inverse of its corresponding target $B_i$ is then rescales.

To aid in understanding of the present invention, two examples of suitable flap matrices with target brightnesses indicated are presented as

| ρ0 | ρ1 | ρ2 | ρ3 | B |
|---|---|---|---|---|
| 0 | 0 | 0 | 0 | 0 |
| 0 | 0 | 0 | 1/8 | 1/8 |
| 0 | 0 | 1/4 | 0 | 2/8 |
| 0 | 0 | 1/4 | 1/8 | 3/8 |
| 0 | 1/2 | 0 | 0 | 4/8 |
| 0 | 1/2 | 0 | 1/8 | 5/8 |
| 0 | 1/2 | 1/4 | 0 | 6/8 |
| 0 | 1/2 | 1/4 | 1/8 | 7/8 |
| 1 | 0 | 0 | 0 | 8/8 |
| 1 | 0 | 0 | 1/8 | 9/8 |
| 1 | 0 | 1/4 | 0 | 10/8 |
| 1 | 0 | 1/4 | 1/8 | 11/8 |
| 1 | 1/2 | 0 | 0 | 12/8 |
| 1 | 1/2 | 0 | 1/8 | 13/8 |
| 1 | 1/2 | 1/4 | 0 | 14/8 |
| 1 | 1/2 | 1/4 | 1/8 | 15/8 |
| 0 | 1/4 | 3/8 | 7/16 | 17/16 |
| 0 | 1/4 | 3/8 | 9/16 | 19/16 |
| 0 | 1/4 | 5/8 | 7/16 | 21/16 |
| 0 | 1/4 | 5/8 | 9/16 | 23/16 |
| 0 | 3/4 | 3/8 | 7/16 | 25/16 |
| 0 | 3/4 | 3/8 | 9/16 | 27/16 |
| 0 | 3/4 | 5/8 | 7/16 | 29/16 |
| 0 | 3/4 | 5/8 | 9/16 | 31/16 |
| 1 | 1/4 | 3/8 | 7/16 | 33/16 |
| 1 | 1/4 | 3/8 | 9/16 | 35/16 |
| 1 | 1/4 | 5/8 | 7/16 | 37/16 |
| 1 | 1/4 | 5/8 | 9/16 | 39/16 |
| 1 | 3/4 | 3/8 | 7/16 | 41/16 |
| 1 | 3/4 | 3/8 | 9/16 | 43/16 |
| 1 | 3/4 | 5/8 | 7/16 | 45/16 |
| 1 | 3/4 | 5/8 | 9/16 | 47/16 |

Figure 11:
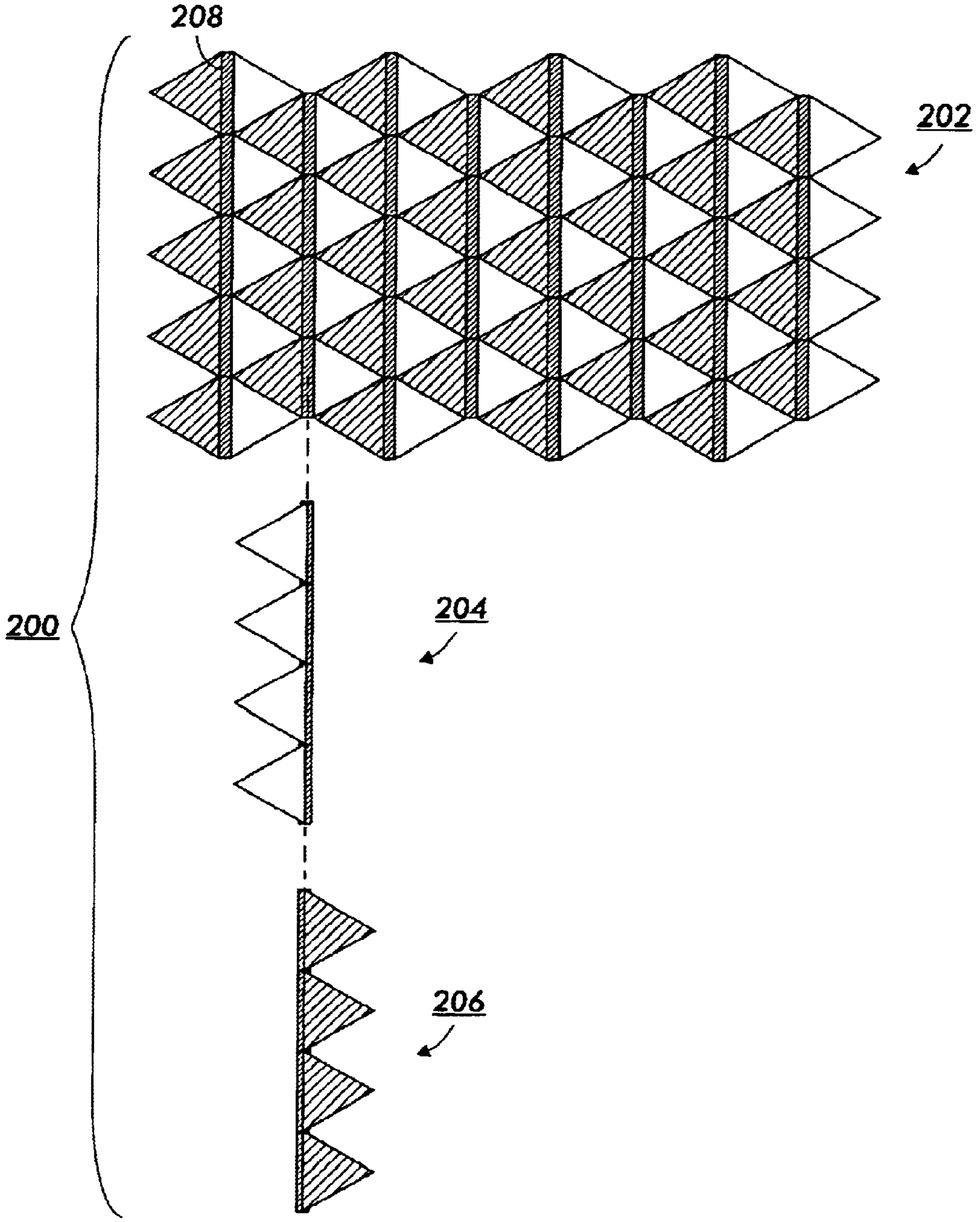
FIG. 11 illustrates an embodiment of an visual display with triangular flaps arranged in a plane covering tiling pattern.
Figure 12:
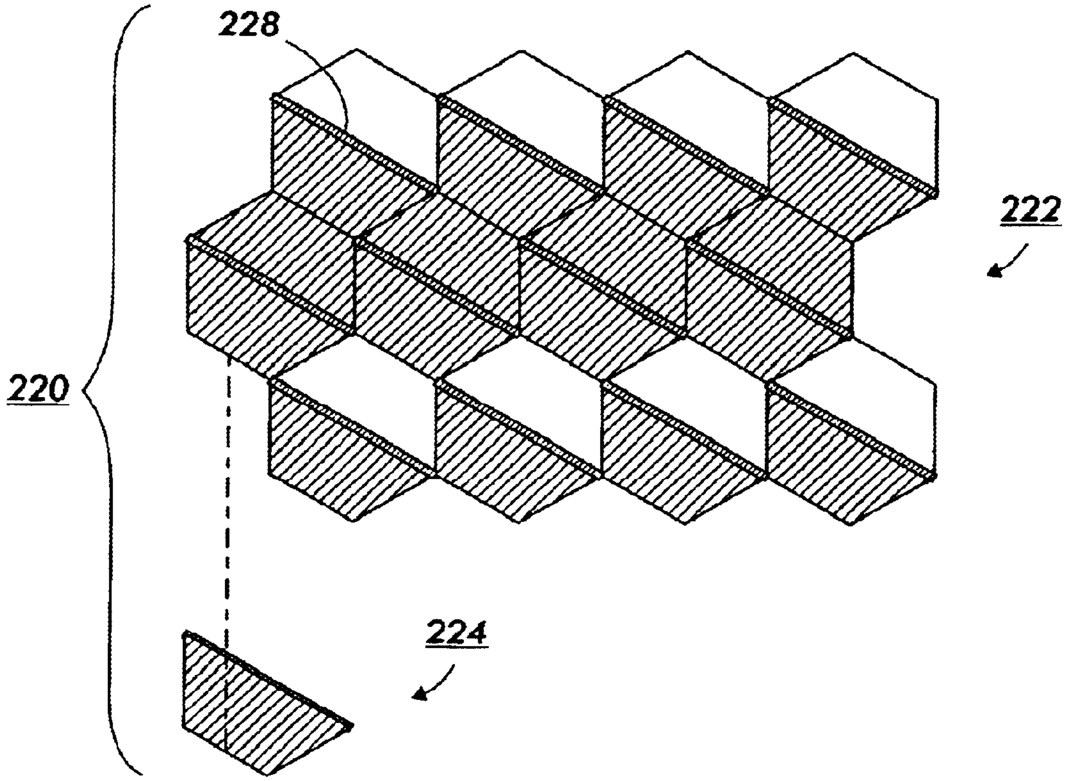
FIG. 12 illustrates an embodiment of an visual display with flaps shaped as bifurcated hexagons arranged in a plane covering tiling pattern.

As will be appreciated by those skilled in the art, various two dimensional tiling patterns can be useful in conjunction with the present invention. As seen in FIG. 10, one embodiment of an visual display 180 has square flaps 182 attached by hinges 188 and arranged in a plane covering tiling pattern. Alternatively, as seen in FIG. 11, an embodiment of an visual display 200 with triangular flaps 208 attached by hinges 208 and arranged in a plane covering tiling pattern. Flaps can be black (row 206) or white (row 204) and move with respect to a triangular regions in a background substrate (row 202). In still other embodiments such as illustrated with respect to FIG. 12, a visual display 220 can include hinge 228 attached flaps (row 222) shaped as bifurcated hexagons (row 224) arranged in a plane covering tiling pattern.

Figure 13:
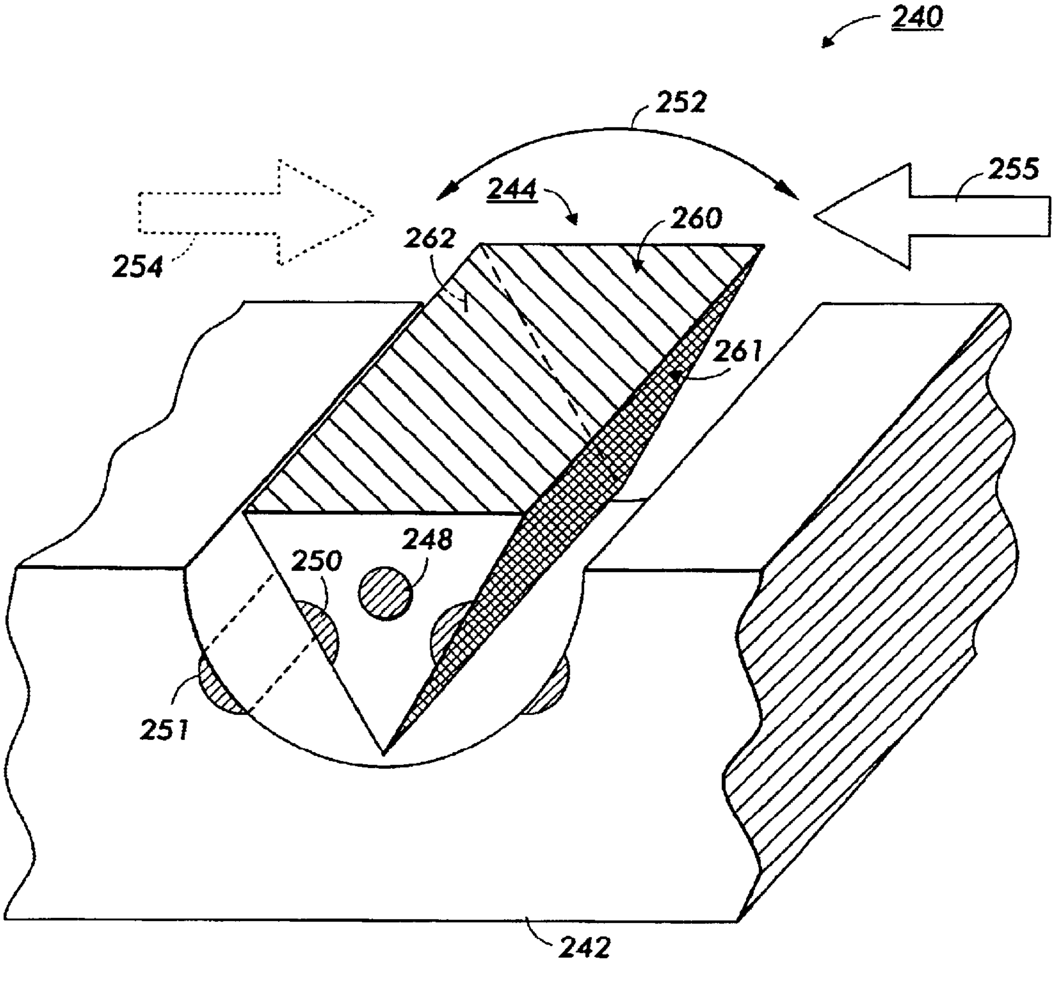
FIG. 13 illustrates a rotatable solid spinnable on an axis to display differing colors.

As those skilled in the art will appreciate, the present invention is not limited to rotation of flaps to present various grayscales or chromaticities. For example, FIG. 13 illustrates a color display system 240 that includes rotatable, faceted prism 244 spinnable on an axis 248 to display differing colors or gray scales (on faces 260, 261, 262). The prism 244 is spun (arrow 252) around an axis 248 by an air-jet (arrows 254 or 255), each face reflecting one of the primary/secondary colors. The display system 240 can be made using conventional surface lithography, with the prism 244 pivot attachment point created in substrate 242 using sacrificial layers above and below the pivot axis. The prism 244 will tend to orient itself relative to gravity and will show a face at a particular set of angles. By knowing its current state, a number of "puffs" will rotate the prism 244. In preferred embodiments a suitable electrostatic or electromagnetic catchment mechanism (e.g. electrostatic attraction between elements 250 and 251) and an overlying glass electrode (not shown) can be used to capture the prism 244 in a desired color state. A jet of air would result in rotation between color states.

As those skilled in the art will appreciate, other various modifications, extensions, and changes to the foregoing disclosed embodiments of the present invention are contemplated to be within the scope and spirit of the invention as defined in the following claims.

What is claimed is:

1. A display array element comprising a substrate, a prism rotatable relative to the substrate, the prism having a first viewable surface having first reflectance characteristics and a second viewable surface having second reflectance characteristics, and a fluid conduit defined in part by the substrate, the fluid conduit permitting direction of fluid against the prism to rotate the prism to selectively allow viewing of one of the first and second viewable surfaces.

2. The display array element of claim 1, wherein the fluid conduit is attached to a pneumatic pressure source for directing air against the prism.

3. The display array element of claim 1, wherein the fluid conduit is attached to a pneumatic pressure source for directing air substantially parallel to one of the first and second viewable surfaces of the prism.

4. The display array element of claim 1, further comprising a rotation catchment mechanism to limit rotation of the prism.

5. The display array element of claim 1, further comprising a rotation catchment mechanism to limit rotation of the prism when the prism is oriented to make the first viewable surface viewable.

6. The display array element of claim 1, further comprising a transparent sheet positioned in parallel spaced apart relationship to the substrate to define the fluid conduit.

7. The display array element of claim 1, further wherein the prism further comprises a third viewable surface having third reflectance characteristics, and wherein the first, second, and third reflectance characteristics are respectively viewable as differing gray levels.

8. The display array element of claim 1, further wherein the prism further comprises a third viewable surface having third reflectance characteristics, and wherein the first, second, and third reflectance characteristics are respectively viewable as white, gray, and black.

9. The display array element of claim 1, further wherein the prism further comprises a third viewable surface having third reflectance characteristics, and wherein the first, second, and third reflectance characteristics are respectively viewable as solid colors.

10. The display array element of claim 1, further wherein the prism further comprises a third viewable surface having third reflectance characteristics, and wherein the first, second, and third reflectance characteristics are respectively viewable as primary colors.

11. The display array element of claim 1, further wherein the prism further comprises a third viewable surface having third reflectance characteristics, and wherein the first, second, and third reflectance characteristics are respectively viewable as secondary colors.

* * * * *